INVENTORS
GIULIO NATTA,
GIORGIO MAZZANTI,
GIORGIO BOSCHI

INVENTORS
GIULIO NATTA,
GIORGIO MAZZANTI,
GIORGIO BOSCHI

3,300,459
ELASTOMERIC COPOLYMERS OF ETHYLENE AND PROPYLENE

Giulio Natta, Giorgio Mazzanti, and Giorgio Boschi, all of Milan, Italy, assignors to Montecatini Edison S.p.A., Milan, Italy
Filed Aug. 11, 1966, Ser. No. 575,484
Claims priority, application Italy, Dec. 23, 1955, 18,119/55
2 Claims. (Cl. 260—88.2)

This application is a continuation-in-part of our application Serial No. 629,085, filed December 18, 1956.

This invention relates to new products which are elastomers and intermediates for the production of elastomers. The new products consist essentially of linear homogeneous copolymers of propylene and ethylene characterized in (a) Containing from 20 to 70% by weight of ethylene in the macromolecule;

(b) Being substantially completely amorphous at the X-rays;

(c) Showing, in the infra-red spectrum, absorption bands at 7.25 microns, 8.6 microns, in the 10 to 11 microns regions and in the 13 to 14 microns region;

(d) Having a molecular weight above 20,000 (as determined by viscosity measurements in tetralin at 135° C. and calculated by the formula $[\eta] = 1.18 \times 10^{-3} \times M^{0.65}$, in which $[\eta]$ represents intrinsic viscosity and M represents molecular weight);

(e) Being substantially completely soluble in boiling n-heptane and completely or substantially completely free of both polypropylene and polyethylene, (f) Being non-plastic and non-film-forming; and (g) Being vulcanizable to excellent vulcanized elastomers of synthetic rubbers.

The products of the invention are obtained by copolymerizing in the liquid phase a mixture of propylene and ethylene in contact with a catalyst prepared by mixing a hydrocarbon solvent-soluble vanadium compound with an alkyl aluminum compound in which the alkyl groups contain from 2 to 16 carbon atoms, while maintaining a molar ratio of propylene to ethylene in the liquid phase of at least 4:1, which corresponds under normal conditions (room temperature and atmospheric pressure) to a molar ratio in the gas phase of 1:1.

In these new linear, homogeneous copolymers, each macromolecule contains the two components and the products are free of homopolymers. This is established by the results obtained when the crude copolymerization product is fractionated by solvent extraction, and by the characteristics of the fractions obtained.

Figure 1:
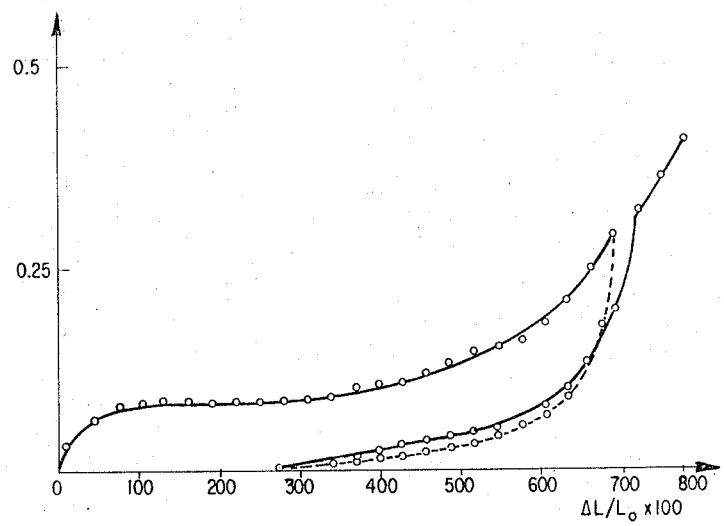
Figure 2:
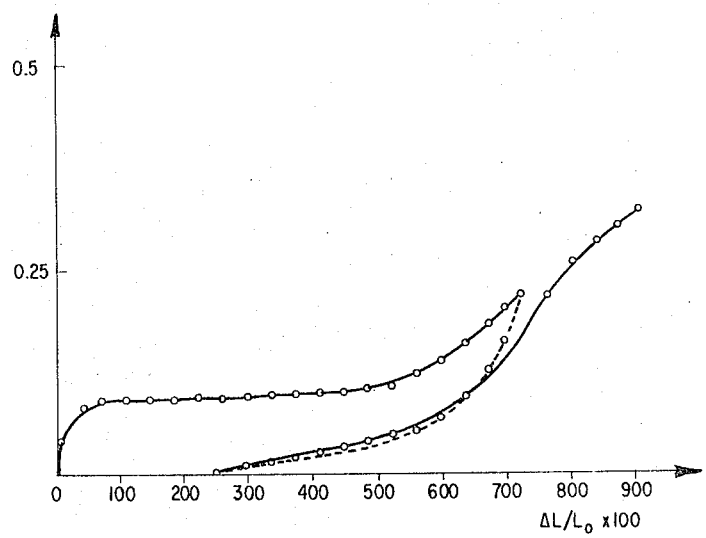

When the copolymers containing from 20 to 70% of ethylene in the macromolecule are die-molded at 120° C. to 150° C. and tested according to ASTM D–412–51T, the molded specimens are found to have a low elastic modulus, a high elongation at break, and a reversible elastic elongation of at least 50% as shown in FIGURES 1 and 2 of the drawing illustrating the behavior of the specimens during the first deformation cycle, which is the behavior of an unvulcanized elastomer capable of being used for the production of a competitive commercial vulcanized elastomer (rubber).

The crude (total) copolymerization products comprise only a small amount of oily fractions extractable with acetone. This is in contrast to the results obtained when these particular catalysts are used in the polymerization of propylene alone. In the latter case, the crude homopolymerizates comprise an appreciably larger amount of oily acetone-extractable fraction.

Another difference exists between the homopolymerizates of propylene and the elastomers prepared with the aid of the catalysts described herein. In the former instance, when the crude homopolymerizate is extracted successively with boiling acetone, ether and n-heptane, it is found to comprise a crystalline portion which is not extractable with n-heptane and remains as residue of the heptane extraction; in the latter case, the crude copolymerizate does not comprise crystalline portions, and when it is extracted successively with the solvents acetone, ether and n-heptane, there is no residue of the n-heptane extraction.

Polyethylene is insoluble in acetone and ether, and only a small portion thereof is extractable with n-heptane. Crude polypropylene (homopolymer of pure propylene) also shows a residue remaining after extraction with n-heptane. On the other hand, when the crude copolymerizates of the invention are extracted with n-heptane, no or practically no residue remains, not even when the ethylene content of the macromolecules is as high as about 70% by weight. This demonstrates that the monomers in the starting mixture have been copolymerized to produce the copolymerizates consisting essentially of the amorphous copolymeric macromolecules extractable with n-heptane and free or substantially completely free of homopolymers.

In the examples below, and as indicated previously the copolymerizates were extracted successively with the acetone, ether and n-heptane to establish the characteristics of the copolymerizates and the substantial absence therefrom of both polypropylene and polyethylene. However, the crude (total) copolymerizates of the invention are practically completely amorphous and can be used, directly as obtained and without troublesome and time-consuming fractionation. The copolymerizates are elastomers having the characteristics stated and can be used as intermediates for the production of elastomers (rubbers).

Further evidence that the elastomers and intermediates for the production of elastomers (rubbers) of the invention consist essentially of amorphous copolymers is obtained by X-ray examination of the copolymerizates and by a study of the infra-red spectra thereof.

As shown by the examples below the infra-red spectra of the crude (total) copolymerizates, of the acetone-extractable, of the ether-extractable and of the heptane-extractable fractions show some important differences from the spectrum of amorphous polypropylene. In addition to the bands due to the methyl group, they show bands due to sequences of methylene groups.

Thus, in the range 13.4 to 13.8 microns, bands due to the presence of sequences of methylene groups can be clearly detected in the spectrum of the ether extractable and of the heptane-extractable fractions of the copolymerizates.

More precisely, bands due to $-(CH_2)_n-$ groupings in which $n$ is between 2 and 6, and the band corresponding to $n$ higher than 6 can be detected.

A strong absorption is generally present at 13.85 microns accompanied by other absorptions, at 13.3 and 13.6 microns, the intensity of which depends mainly on the specific composition of the copolymerizate.

Figure 4:
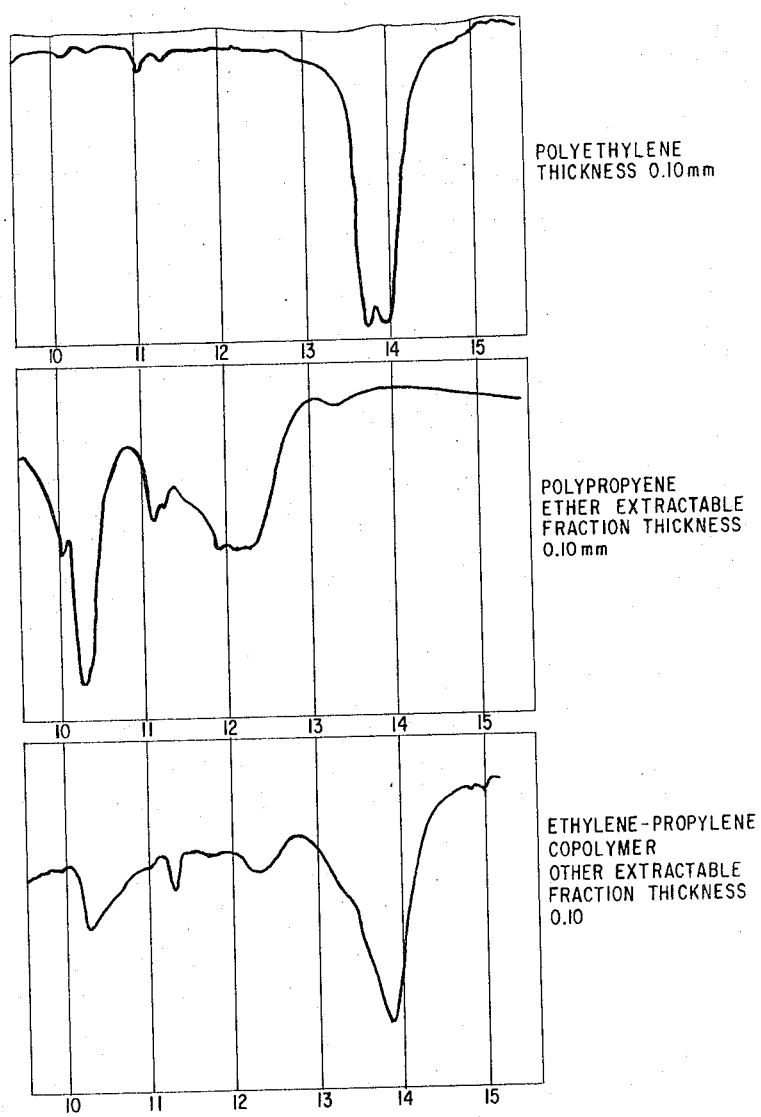
Figure 5:
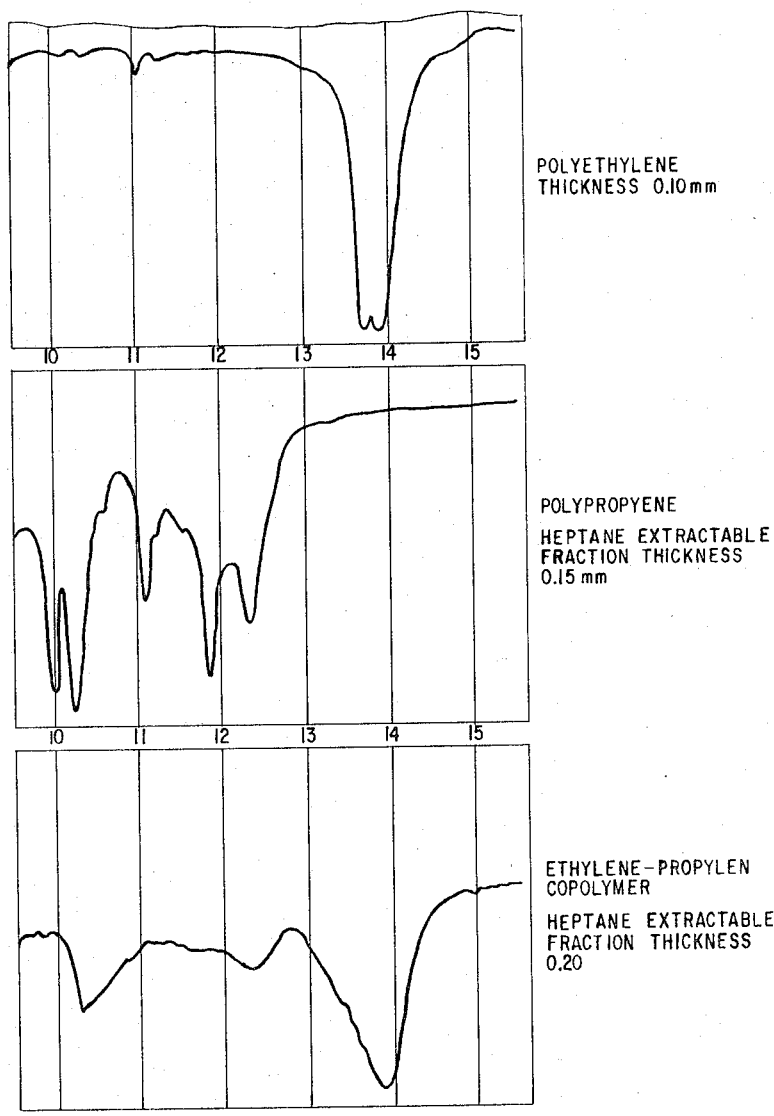

On the other hand, absorptions are present also in the 10 to 11 microns region, due to the presence of sequences of propylene units. The simultaneous presence of multiple absorptions in the two regions is characteristic for our amorphous, random ethylene-propylene copolymerizates. Typical spectra of fractions of these copolymerizates are shown at the bottom of FIGURES 4 and 5. In these figures the infra-red spectra in the 9.5 to 15 microns region for the ether-extractable, respectively heptane-extractable portion of a copolymerizate according to our invention, and containing approximately 38% by weight of propylene, are compared with the spectra for a linear polyethylene and for a linear, ether-extractable, respectively heptane-extractable polypropylene.

Such typical spectra of the copolymerizates shown at the bottom of FIGURES 4 and 5 of the drawing show, in the 13 to 14 micron region, absorptions at 13.6 microns and 13.85 microns and show, in the 10 to 11 micron region, absorptions at 10.67 microns and at 10.3 microns.

The percentage of propylene present in the copolymer can be determined from the infra-red spectrum by measuring the intensity of the bands of the methyl group. More precisely, the propylene content can be evaluated by measuring the intensity of the band at 7.25 microns, in carbon tetrachloride solution, using an absorption factor obtained from measurements performed under comparable conditions on a solution of pure polypropylene.

The percentages of propylene in the copolymerizates can be determined also from the infra-red spectrum of solid laminar specimens, by measuring the intensity of the band at 8.60 microns. The absorption factor can be evaluated from measurements on copolymers the composition of which is established by radiochemical analysis.

When the ether-extractable fractions of the copolymerizates are examined under the X-rays, those fractions are always found to be amorphous but the spectrum shows a maximum which is clearly shifted as compared to that of pure amorphous polypropylene. The composition of the copolymer can be calculated on the basis of such shifting or displacement of the maximum shown in the spectrum.

The heptane-extractable fractions of the copolymerizates also show, on X-ray examination, a spectrum which is different from the spectrum of heptane-extractable fractions of pure polypropylene. The X-ray diffraction spectrum for the heptane-extractable portion of the copolymerizates shows that this fraction is completely or substantially completely amorphous.

Figure 3:
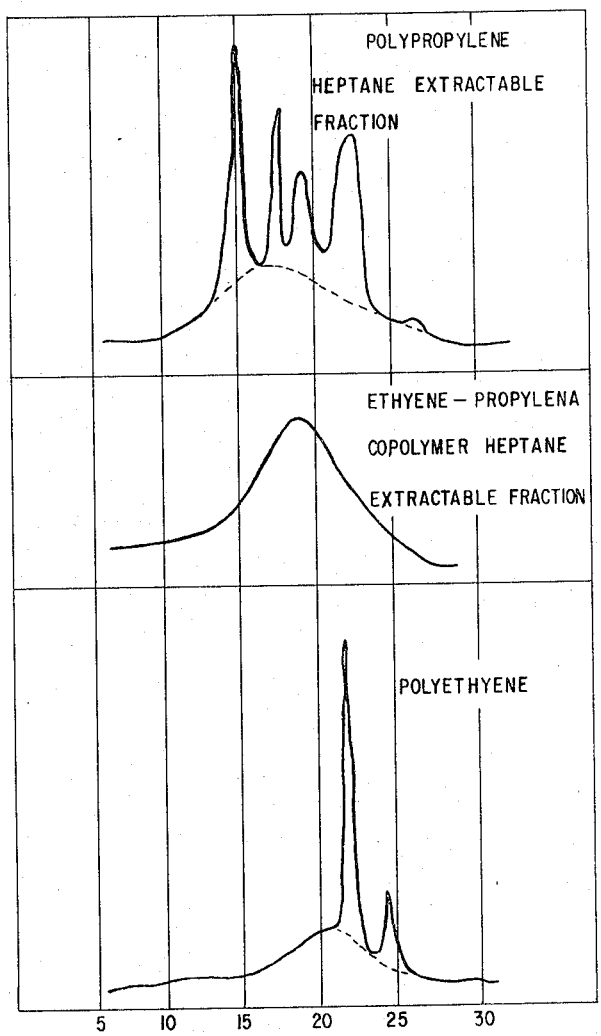

The absence of crystalline polypropylene and the presence of an amorphous ethylene-propylene copolymer is evident from FIGURE 3 of the drawings. This figure shows the X-ray diffraction spectra of a sample of linear polyethylene, a sample of linear, partially crystalline polypropylene extractable with boiling n-heptane, and of a sample of the n-heptane extractable portion of a copolymer of the invention and containing approximately 45% weight of propylene.

The diffraction peaks characteristic for crystalline polyethylene and polypropylene are clearly absent from the copolymer spectrum. The latter is clearly an amorphous material in which the diffraction maximum is shifted as compared to the maxima for amorphous polyethylene and polypropylene corresponding to the broken lines of the polyethylene and polypropylene diagrams.

The composition of the copolymerizates of the invention can be determined, also, and with particular accuracy, by labeling one of the monomers with $C^{14}$ and measuring the specific activity of the copolymerizate by means of a Geiger counter as exemplified hereinbelow.

All of the above tests and determinations prove that the copolymerizates of this invention are different from the homopolymers of the monomers and from mixtures of homopolymers and copolymers, and that the copolymerizates are free or substantially completely free of homopolymers.

The copolymers having a molecular weight above 20,000 and containing from 20% to 70% of ethylene by weight in the macromolecule are distinctly different, as intermediates in the production of elastomers (rubbers), from the copolymers of lower average molecular weight and containing in the macromolecule an amount of ethylene by weight which is greater than 70%, or less than about 20%.

The copolymers containing, in the macromolecule, an amount of ethylene higher than about 70% by weight, show long sequences of methylene groups and tend to show crystallinity of polyethylene type.

When the copolymerizates having ethylene contents below about 20% by weight in the macromolecule are used as intermediates for the production of vulcanized elastomers (rubbers) the final products are found, when subjected to standard mechanical tests, to have properties different from and markedly inferior to the properties of the vulcanized elastomers (rubbers) obtained by the same methods from the elastomer intermediates which are copolymerizates containing 20 to 70% by weight ethylene.

The following examples are illustrative of the invention.

EXAMPLE 1

A solution of 0.025 mole trihexyl aluminum in 300 cc. n-heptane is introduced under nitrogen into a 2080 cc. autoclave. 185 g. of a propylene-propane mixture containing 88.5% propylene, and 12 g. ethylene are then added. Thus, the mole ratio of propylene to ethylene is 9.05:1. The mixture is heated under agitation up to 45° C. and at this temperature a solution of 0.008 mole $VOCl_3$ in 50 cc. heptane is injected into the autoclave. After a few minutes a spontaneous temperature increase from 45 to 65° C. is noticed while the pressure drops from 28 to 23 atm. 150 cc. methanol are then injected into the autoclave, to decompose the catalyst and stop the reaction. The polymerization product is discharged and purified by treatment with solvents acidified with hydrochloric acid, and subsequent complete coagulation with methanol. 43 g. of product are thus obtained, with a conversion corresponding to 24.4% of the monomers employed. The copolymerizate obtained is then fractionated by extraction with hot solvents.

The acetone extract corresponds to 14% of the total product and consists of low molecular weight copolymers of oily appearance. In the infra-red spectrum of this fraction both the band due to the methyl groups and the bands due to sequences of methylene groups are very clearly visible.

The ether extract corresponds to 66.4% and consists of a solid product having the appearance of a non-vulcanized elastomer. This fraction shows an intrinsic viscosity of 0.89 (corresponding to a molecular weight of about 27,000) and appears amorphous at an X-ray examination, with a maximum of the amorphous spectrum which is decidedly shifted as compared to that of amorphous polypropylene. This fraction was also submitted to an infra-red examination. From the infra-red spectrum it is determined that sequences of methylene groups yielding bands between 13.4 and 13.8 microns are present, and it is possible to calculate a propylene content of about 85% by weight.

The heptane extract, corresponding to 19.6% of the total, is a solid of intrinsic viscosity 2.44. The X-ray spectrum does not indicate any crystallinity but shows a maximum of the amorphous which is decidedly shifted with respect to that of the amorphous propylene polymers. From the infra-red spectrum of this fraction a propylene content of 48% can be calculated. No residue was found after the extraction with heptane. This provides that in this method of making the copolymerizate, no pure ethylene polymer was formed.

EXAMPLE 2

A solution of 0.02 mole trihexyl aluminum in 300 cc. heptane, and 210 g. of a propylene-propane mixture containing 88.5% propylene, and 40 g. ethylene are introduced under nitrogen into an autoclave of 2,000 cc. capacity. The initial propylene/ethylene mol ratio is therefore 3.1:1. The autoclave is heated to 45° C. and at this temperature a solution of 0.008 mole $VOCl_3$ in 50 cc. heptane is added. A rapid temperature increase of about 20° C. occurs, while a rapid pressure decrease is noted. 200 cc. methanol are added to stop the reaction and the polymerization product is removed from the reactor. After purification and drying, it amounts to 74 g. A sample is mixed with an inert carrier and fractionated by extraction with hot solvents.

An examination by infra-red spectrography shows that the acetone extract (18% of the treated product) consists of ethylene-propylene copolymers.

The ether extract (37.3%) consists of a solid product which in appearance is similar to a non-vulcanized elastomer. At an X-ray examination, this fraction is found to be completely amorphous and yields a spectrum having the maximum decidedly shifted with respect to that of the amorphous polypropylene. From this displacement a propylene content of 43% is calculated. The infra-red spectrum shows that sequences of polyethylene groups are present, and from the intensity of the band of methyl groups a propylene content of 45% is calculated. This fraction has, in tetralin solutions at 135° C., an intrinsic viscosity of 0.78, corresponding to a molecular weight of about 22,000.

The heptane extract (44.7%) has an intrinsic viscosity of 2.55. This fraction appears almost completely amorphous at an X-ray examination and from the position of the maximum of the amorphous a propylene content of about 20% by weight is calculated. On the basis of an infra-red examination, a propylene content of 22% by weight is calculated.

No residue is found after the extraction with heptane.

It can be concluded, therefore, that the products obtained consist of ethylene-propylene copolymers and are free from homopolymers of either monomer, i.e., from both polyethylene and polypropylene.

EXAMPLE 3

The monomer mixture which is used in the copolymerization is prepared by introducing 104 g. of a mixture of propylene and propane containing 88.5% propylene, and 15 g. ethylene into a shaking autoclave of 1100 cc. capacity. The autoclave is then heated under shaking up to 180° C., so that a gaseous mixture is obtained containing the two monomers in a molar ratio propylene: ethylene=4.1:1.

This autoclave is then connected with a second autoclave of 2080 cc. capacity, which was previously charged with a solution of 0.02 mole trihexyl aluminum in 350 cc. heptane. While keeping this second autoclave in motion, at room temperature, the gaseous mixture of the two monomers is pumped in up to a pressure of 3.5 atm.

A solution of 0.002 mole of $VOCl_3$ in 50 cc. heptane is then injected into the polymerization autoclave, and the autoclave is kept in motion, while introducing continuously the mixture of the two monomers, reaching, in about 5 min., a pressure of 10 atm. 200 cc. methanol are then introduced into the autoclave in order to stop the reaction.

From the reservoir autoclave 17 g. of the mixture are recovered.

After purification and drying, 19.5 g. of products are obtained corresponding to a conversion of 21.5% of the monomers introduced into the polymerization autoclave. The product is fractionated by solvent extraction in a Kumagawa extractor, after mixing it with an inert material.

The acetone extract, corresponding to 7.1% of the total product, consists of a copolymer of low molecular weight. The infra-red spectrum of this fraction clearly shows bands attributable to sequences of methylene groups and the band of the methyl group.

The ether extract, corresponding to 39.5% of the total, consists of a solid product, similar in appearance to a non-vulcanized elastomer, and having an intrinsic viscosity of 1.60, corresponding to a molecular weight of about 66,000. This fraction appears completely amorphous under the X-rays, and the maximum of the amorphous polymer spectrum is clearly shifted in respect of the maximum of the pure amorphous polypropylene. From this shift one can calculate a propylene content of approximately 50% by weight.

The infra-red spectra clearly show the presence of bands between 13.4 and 13.8 microns. From the intensity of the band due to the methyl groups, a propylene content of 60% by weight is calculated.

The heptane extract, corresponding to 53.5% of the total, has an intrinsic viscosity of 4.05, corresponding to a molecular weight of approximately 274,000.

FIGURE 1 gives a stress-elongation graph obtained with specimens prepared from this fraction according to the ASTM test mentioned above. This fraction appears completely amorphous under the X-rays and the position of the maximum of the amorphous polymer spectrum indicates a propylene content of about 40%.

From the infra-red spectrum this fraction can be said to be an ethylene-propylene copolymer, having a propylene content of 31%.

EXAMPLE 4

179 g. of a propylene-propane mixture containing 88.5% propylene, and 14 g. ethylene, are introduced in a shaking autoclave of 1100 cc. capacity which is used as a reservoir. The molar ratio between propylene and ethylene is 7.52:1. The reservoir autoclave is heated under shaking up to 200° C. The polymerization apparatus proper is a 2080 cc. autoclave, the head of which is fitted with two cocks, one of which is connected to a tube reaching the bottom of the autoclave and through which gas can be bubbled in. A solution of 0.02 mole trihexyl aluminum in 450 cc. heptane is introduced in the previously evacuated polymerization autoclave. The gaseous mixture of the two monomers is then introduced from the reservoir into the polymerization autoclave, up to a pressure of 2 atm. Thereafter a solution of 0.002 mole $VOCl_3$ in 50 cc. heptane is injected under stirring. The polymerization autoclave is then set in vertical position and the monomers are fed in continuously through the cock connected to the bubbler, while the excess gas is vented continuously, keeping a constant pressure of 5.5 atm. After about 5 minutes 56 liters of gas are collected from the autoclave, the feeding is stopped and methanol is pumped into the polymerization autoclave.

The temperature is kept for the entire duration of the run at 25° C. The product is purified by treatment with hydrochloric acid and then completely coagulated with methanol. After a further washing with methanol and drying under vacuum in the heat, 15.5 g. of a solid product similar in appearance to a non-vulcanized elastomer are isolated. Fractionation is carried out by extraction with hot solvents.

The acetone extract, corresponding to 3.7% of the polymer obtained consists of low molecular weight oily product. The infra-red spectrum of this fraction shows bands attributable to sequences of methylene groups, and the bands of the methyl groups.

The ether extract, corresponding to 65.5%, consists of a solid product similar in appearance to a rubber, with an intrinsic viscosity of 2.45, corresponding to a molecular weight of about 126,000. The infra-red spectrum of this ether-extractable fraction shows the bands corresponding to sequences of methylene groups. From the intensity of the band due to the methyl groups, a propylene content of approximately 55% is calculated. The X-ray examination confirms that this fraction consists of an amorphous copolymer having a propylene content of about 53%.

The heptane extract corresponds to 30.8% and consists of a solid product with an intrinsic viscosity of 4.28, i.e., a molecular weight of about 300,000. From the infra-red spectrum a propylene content of 36% is calculated. From the X-ray spectrum this fraction appears as an amorphous copolymer containing 33% propylene. The extraction with heptane leaves no residue.

The products obtained in this example are clearly ethylene-propylene copolymers, free of macromolecules prevailingly formed of a polymer of a single olefine.

EXAMPLE 5

Using the apparatus described in the previous examples, 207 g. of a propylene-propane mixture containing 88.5% of propylene, and 29 g. of ethylene are employed to obtain a propylene-ethylene ratio of 4.35:1. The reservoir is heated under shaking to 200° C. 0.02 mole of trihexyl aluminum dissolved in 450 cc. heptane are introduced into the polymerization autoclave. The gaseous monomers are then added, up to a pressure of 2 atm. Thereafter a solution of 0.002 mole $VOCl_3$ in 50 cc. heptane is injected and, after a few minutes, the autoclave is set in a vertical position and the feeding and continuous venting of the gases is started, keeping a constant pressure of 6 atm. at temperatures between 20 and 25° C. After about 10 minutes, 100 liters of gas are collected at the exit of the autoclave, and the run is stopped by injecting methanol. Proceeding as described in the previous examples, 26.3 g. of a copolymer consisting of a solid product similar in appearance to a non-vulcanized elastomer are isolated. Fractionation is carried out by extraction with hot solvents.

The acetone extract, corresponding to 7% of the total, is formed of oily products of low molecular weight. The infra-red spectrum shows that this fraction consists of ethylene-propylene copolymers.

The ether extract corresponding to 54% is a solid elastic product, having an intrinsic viscosity of 2.0, corresponding to a molecular weight of 94,000. This fraction appears completely amorphous under the X-rays. From the shift of the maximum in the spectrum of the amorphous, a propylene content of about 50% is calculated. The infra-red spectrum shows that this fraction is a copolymer, with a propylene content of 64%.

The heptane extract, corresponding to 39.0% has an intrinsic viscosity of 4.75, corresponding to a molecular weight of about 348,000. This heptane extract, when examined under the X-rays, appears formed by more than 95% of an amorphous copolymer containing approximately 33% propylene. A slight crystallinity is detectable, attributable to copolymer macromolecules very rich in ethylene. The infra-red spectrum of this fraction shows that it contains 33% propylene. FIGURE 2 gives a stress-elongation curve determined on specimens obtained in the usual way from the heptane extract.

The extraction with heptane leaves no residue.

EXAMPLE 6

A solution of 0.03 mole trihexyl aluminum in 350 cc. heptane, 62 g. propylene and 11 g. ethylene are introduced in a two liter autoclave previously filled with nitrogen. The molar ratio between propylene and ethylene is 3.72:1. Keeping the autoclave in motion, a solution of 0.003 mole of $VOCl_3$ in 50 cc. heptane is injected. The temperature rises in a few minutes to 30° C., while the pressure drops from 8.5 to 7 atm. 200 cc. of methanol are then injected and, after a few minutes shaking, the autoclave is emptied and, after purification and drying as usual, 25 g. of product are isolated (corresponding to a 33% conversion) which product is fractionated by extraction with hot solvents.

The acetone extract, corresponding to 7.4% of the total, consists of oily, low-molecular weight products, which the infra-red spectrum shows to consist of ethylene-propylene copolymers.

The ether extract, corresponding to 38%, is a solid product of intrinsic viscosity 1.16, corresponding to a molecular weight of about 39,800. It has the appearance of a non-vulcanized elastomer. The X-rays examination shows that this fraction is an amorphous copolymer. The maximum of the diffraction intensity is clearly shifted as compared to the corresponding maximum of pure amorphous polypropylene. From this shift one can estimate a propylene content of about 50%. The infra-red spectrum shows bands attributable to sequences of various lengths of methylene groups, and a propylene content of approximately 67%.

The heptane extract, corresponding to 52.5% is a solid product with an intrinsic viscosity of 3.90, corresponding to a molecular weight of about 260,000. Under the X-ray this extract appears as formed by approximately 92% of an amorphous copolymer, containing about 15% propylene. The presence of certain bands indicates a slight crystallinity (approximately 8%). These bands are shifted in respect to the bands of pure crystalline polyethylene.

The extraction with heptane leaves no residue. The infra-red spectrum of the heptane extract shows a propylene content of 20%.

EXAMPLE 7

A solution of 0.2 mole trihexyl aluminum in 300 cc. heptane, 169 g. of a propylene propane mixture containing 152 g. propylene, and 34 g. ethylene are introduced into an autoclave of about 2,000 cc. capacity, from which the air has been previously removed. The initial mol ratio of propylene to ethylene is therefore 3:1.

The mixture is heated, while agitating, to 90° C. and at this temperature a solution of 0.008 mole $VOCl_3$, in 60 cc. heptane is injected into the autoclave. The temperature rises spontaneously in a few minutes up to 115° C., while the pressure drops from 40 to 25 atm. A few minutes after addition of the $VOCl_3$, 150 cc. methanol are introduced into the autoclave, to decompose the catalyst and stop the reaction. The residual gases are then vented, 85 Nl containing 75.9% of propylene and 5.1% of ethylene being collected.

From the amount of monomers that has disappeared it is found that 0.75 mole propylene and 1 mole ethylene, corresponding to 59.5 g., have reacted. The product obtained is purified as in the foregoing examples and 58 g. of white solid product of rubbery appearance are isolated. This product is then fractionated by extraction with hot solvents.

The acetone extract corresponds to 26% and consists of ethylene-propylene copolymers the propylene content of which is, on the basis of the infra-red spectrum, 85% by weight.

The ether extract corresponds to 60.5% and consists of a solid of rubbery appearance which appears amorphous at an X-ray examination and shows a maximum in the diffracted intensity which is markedly shifted with respect to that of amorphous polypropylene (homopolymer). On the basis of this displacement a propylene content of about 45% is calculated. From the infra-red spectrum a propylene content of 35% is calculated.

The fraction extracted with ether shows a density of 0.852 and, in tetralin solution at 135° C., an intrinsic viscosity of 0.62, corresponding to a molecular weight of about 13,000.

The heptane extract (13.4%) has an intrinsic viscosity of 2.70, corresponding to a molecular weight of about 150,000. At an X-ray examination this fraction is found to be amorphous to the extent of about 90%. A slight crystallinity (about 10%) is indicated by the presence of maxima which appear however shifted with respect to those of the pure polyethylene. From the infra-red spectrum of the copolymer extractable with heptane, a propylene content of 17% can be calculated.

EXAMPLE 8

A propylene-ethylene mixture is prepared starting from 99.6% propylene obtained from isopropyl alcohol, and 98% of $C^{14}$ labeled ethylene. This was prepared by hydrogenation of $C^{14}$ labeled barium carbide. The ethylene specific activity, measured with an effective geometry of 30% on a sample of polyethylene, with a Geiger-Muller counter having a mica window of 1.8 mg./cm.$^2$, is 1766 counts per minute. The analysis of the ethylene-propylene mixture is carried out by measuring the specific activity of barium carbonate obtained by adsorbing in barium hydroxide solution the carbon dioxide deriving from the complete combustion of the mixture in a copper oxide furnace at 850–900° C. The results of this analysis were confirmed by mass-spectrography.

The polymerization apparatus consists of a cylindrical glass vessel of 1000 ml. capacity, 65 mm. inside diameter, fitted with a paddle stirrer, a reflux condenser, a dipping inlet tube with fitted glass end, and a gas outlet. 300 ml. n-heptane are introduced in the vessel and saturated with a stream of the two monomers. The catalyst is prepared separately, in a 100 ml. glass flask in a nitrogen atmosphere by adding dropwise, a solution of 0.003 mol $VOCl_3$ in 20 ml. n-heptane under stirring, at 20° C., to a solution of 0.009 mol trihexyl aluminum in 30 ml. n-heptane. After 30 minutes the mixture is introduced in the polymerization vessel.

A mixture of the two monomers, containing 80% by volume of propylene is then fed in for 10 minutes at the rate of 80 l./hr. keeping the temperature between 25 and 30° C. After this time, the reaction is stopped by adding methanol.

The reaction product is purified by treatment with aqueous hydrochloric acid, separation of the two phases, and washing with water, followed by complete coagulation with a methanol-acetone mixture.

After filtration and vaccum drying, 4.7 g. of a solid, white, elastic product are obtained.

From the specific activity measured with a Geiger-Muller counter as above, on a plate prepared from the polymer, a content in ethylene of 31.9% by weight is calculated, using the formula:

$$\frac{\text{Ethylene specific activity}}{\text{copolymer specific activity}} = \frac{a+b}{a}$$

where $a$ is the ethylene, and $b$ the propylene percentage in the copolymer.

47.75% of the copolymerizate is extractable with boiling ether, while extraction with boiling n-heptane leaves no residue.

EXAMPLE 9

Figure 6:
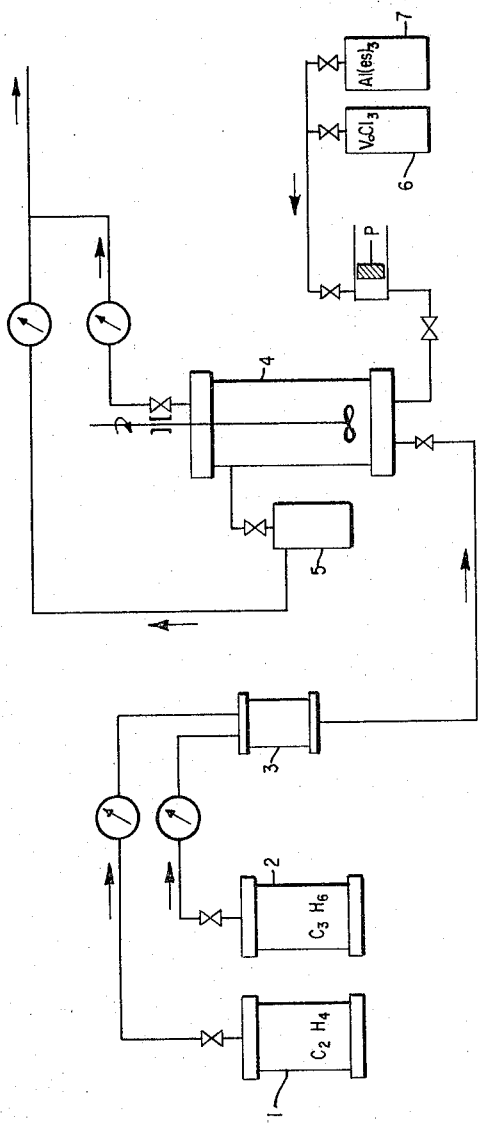

The polymerization is carried out in the apparatus shown in FIGURE 6.

Referring to FIGURE 6, ethylene and a propylene-propane mixture containing 93% propylene are fed continuously from reservoirs 1 and 2 under a pressure of 5 atm., the flow rates being adjusted so as to have a propylene-ethylene molar ratio in the feed of 3.8:1. The gases are mixed in mixing vessel 3, and fed to reactor 4, which is a vertical autoclave of 3600 ml. capacity, internal diameter 100 mm. fitted with a paddle stirrer and with an oil jacket. A benzene suspension of the catalyst, prepared by mixing a 2.5% by weight solution of triisobutyl aluminum in benzene with a 0.5% solution of vanadium oxychloride also in benzene is simultaneously continuously fed into reactor 4 at a rate of 2.0 liters/hour. These solutions of the catalyst components are stored separately, blanketed with nitrogen, in reservoirs 7 and 6 respectively, and are mixed in the feeding pump, designated P in FIGURE 6 of the drawing, before being pumped into the reactor.

The solution of the copolymerizate formed in the reactor 4 is discharged continuously into collection vessel 5 through an overflow near the top of the autoclave. The gas flow at the outlet is kept in the neighborhood of 500 l./hr. The temperature in the autoclave is kept around 40° C. The copolymerizate is purified by treating the benzene solution repeatedly with 10% nitric acid, washing it repeatedly with water, separating the two phases and finally removing the solvent by steam distillation. In a 10 hour run under the above outlined conditions, 1200 g. of a propylene-ethylene copolymerizate are obtained, with an ash content of 0.06%, and a molecular weight of about 160,000. The I.R. spectrum indicates a content of 59% propylene by weight, and the presence of sequences of methylene groups. The copolymerizate is partially (40%) extractable with boiling ether, while the extraction with boiling n-heptane leaves no residue. X-ray examination shows that the obtained product is an amorphous ethylene-propylene copolymerizate.

What is claimed is:

1. Amorphous, elastomeric, linear copolymers of ethylene and propylene containing from 20% to about 70% by weight of ethylene in the macromolecule, characterized in that the infra-red spectra thereof show, in the 13 to 14 micron region, absorptions at 13.6 microns and at 13.85 microns, and show, in the 10 to 11 micron region, absorptions at 10.67 microns and at 10.3 microns, and further characterized in being substantially free of homopolymers, and in having a molecular weight above 20,000, as determined by viscosity measurements in tetralin at 135° C. and calculated by the formula $$[\eta] = 1.18 \times 10^{-3} \times M^{0.65}$$

in which $[\eta]$ represents intrinsic viscosity and M represents molecular weight.

2. Synthetic rubbers consisting essentially of copolymers according to claim 1.

No references cited.

JOSEPH L. SCHOFER, *Primary Examiner.*

M. B. KURTZMAN, *Assistant Examiner.*